(12) United States Patent
Röllig et al.

(10) Patent No.: US 6,839,654 B2
(45) Date of Patent: Jan. 4, 2005

(54) DEBUG INTERFACE FOR AN EVENT TIMER APPARATUS

(75) Inventors: René Röllig, Frankenberg (DE); Jens Meyer, Dresden (DE); Frank Barth, Radebeul (DE); Alexander Krebs, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 10/361,089

(22) Filed: Feb. 7, 2003

(65) Prior Publication Data

US 2004/0003027 A1 Jan. 1, 2004

(30) Foreign Application Priority Data

Jun. 28, 2002 (DE) .......................................... 102 29 129

(51) Int. Cl.[7] .............................................. G04F 10/00
(52) U.S. Cl. .......................................... 702/178; 700/13
(58) Field of Search .......................... 702/178; 700/13; 327/158; 713/502

(56) References Cited

U.S. PATENT DOCUMENTS

| | | | |
|---|---|---|---|
| 4,099,255 A | | 7/1978 | Stanley et al. |
| 5,229,981 A | | 7/1993 | Maschi |
| 5,689,691 A | * | 11/1997 | Mann ......................... 713/502 |
| 5,812,834 A | * | 9/1998 | Suzuki ....................... 713/502 |
| 5,933,344 A | * | 8/1999 | Mitsuishi et al. ............. 700/13 |
| 6,145,103 A | | 11/2000 | Typaldos et al. |
| 6,260,162 B1 | | 7/2001 | Typaldos et al. |
| 6,629,257 B1 | | 9/2003 | Hartwell |
| 2003/0098730 A1 | * | 5/2003 | Miyazaki et al. ........... 327/158 |

FOREIGN PATENT DOCUMENTS

DE          198 35 610 A1     8/1998

* cited by examiner

*Primary Examiner*—John Barlow
*Assistant Examiner*—Xiuqin Sun
(74) *Attorney, Agent, or Firm*—Meyertons Hood Kivlin Kowert & Goetzel, P.C.; Noël Kivlin

(57) ABSTRACT

An on-chip event timer apparatus including a hardware timer and a debug interface. The hardware timer includes at least an up-counter for counting clocks of a clock signal, a match register for storing a programmable count value, and a comparator for monitoring whether the up-counter's count value matches the count value of the match register. The debug interface includes enable control unit for enabling the up-counter's operation based on a pre-defined relationship between a state of an enabled signal supplied to said up-counter and an internal state of the hardware timer. Additionally, the debug interface may comprise a clock divider connected to the enable control unit to reduce the clock's frequency in accordance with a pre-programmed divider value. Based on the received clock with the reduced clock frequency, the enable control unit adapts the up-counter's processing speed to the reduced clock frequency.

21 Claims, 5 Drawing Sheets

DEBUG INTERFACE FOR AN EVENT TIMER APPARATUS

BACKGROUND OF THE INVENTION

1. Field of the Invention

The invention generally relates to the testing and debugging of the operation of an event timer, and more particularly, to an on-chip system and method for monitoring and controlling the event timer's operation for validation purpose.

2. Description of the Related Art

Event timers which are used in personal computers are intended for use by the operating system software. Different kinds of applications may be controlled by event timers, e.g. the synchronization of real time digital audio and video streams, the scheduling of threads, tasks, processes etc. using a fixed rate (periodic) interrupt generation, the scheduling of run time threads, tasks, processes etc. associated with a variable rate (aperiodic) interrupt generation, and applications on multi-processor platforms using such timers as a "platform timer".

Recently, an event timer ("multimedia timer"—MMT) has been developed which is designated to replace previous legacy timers in a personal computer (in particular the 8254 Programmable Interval Timer, the Real Time Clock, the APIC timer and the ACPI timer).

The event timer's architecture defines a set of timers that can be used by the operating system. The timers are defined such that the operating system may be able to assign specific timers to be used directly by specific applications. Each timer can be configured to cause a separate interrupt. An interrupt may be either a (sub-millisecond) periodic interrupt, which is of much finer granularity than provided by previously used timers, or aperiodic timer interrupts.

The event timer enables higher clock resolution for improving multimedia support and enables aperiodic interrupts, improving both multimedia support and overall system performance.

The timers are implemented as a single up-counter with a set of comparators. The basic timer configuration is illustrated in FIG. 1. A clock generator 1 provides a clock signal of a fixed frequency to an up-counter 2. The count result of the up-counter increases monotonically. Each timer includes a match register 3 and a comparator 4. The timer can generate an interrupt when the pre-programmed count value in match register 3 equals the count value of the free-running up-counter 2. The interrupt is forwarded to an interrupt routing logic 5 forwarding the interrupt to appropriate parts of the microprocessor. In particular, the registers associated with the timers may be mapped to memory space allowing the CPU to directly address each of the registers.

A more detailed hardware block diagram of the event timer configuration is shown in FIG. 2. The configuration comprises a single up-counter 2 with a plurality of comparators 10, 11, 12. The count value of the single up-counter 2 increases in accordance with a clock signal received from an (external) clock generator 1. The clock frequency is preferably 14.318 MHz, and the up-counter's count value has a width of 32 bit. In accordance with the recommended hardware implementation, the clock's frequency should not be below 10 MHz. As shown in FIG. 2, the minimum recommended hardware implementation comprises three individual timers including a match register 7, 8, 9 and a comparator 10, 11, 12. Each of the timers can individually generate an interrupt when the pre-set value in its match register 7, 8, 9 equals the count value of the single up-counter 2. Each of the match registers 7, 8, 9 and the comparators 10, 11, 12 should have a width of either 32 bit (minimum) or 64 bit.

In addition, some of the timers may be enabled to generate a periodic interrupt. For this purpose such timers comprise an additional period register 13 and an adder in order to increase the match register's count value periodically.

Further, the individual registers of the event timer may be connected to a data bus allowing to read or write the individual register values.

It has become very difficult to diagnose failures in, and to measure the performance of state of the art event timers. This is because modern event timers run at very high clock speed, too fast for validation software to react in real time. Moreover, visibility of event timers inner states has become increasingly limited due to the complexity of on chip architectures and due to practical constraints on the number of externally available contact pads that can be provided on a chip package.

A need therefore exists for an event timer apparatus, for a debug interface for an event timer apparatus and a method for enabling event timer designers to debug state of the art event timers and systems more easily. More specifically, there exists a need for an on-chip system, an on-chip interface and a method for validating the event timer's functionality.

It is therefore a primary object of this invention to provide an event timer apparatus, a debug interface and a method which allow an easier validation of the event timer's functionality.

Another primary object of this invention is to provide an event timer apparatus, an on-chip debug interface and a method which allows hardware validation without fulfilling real time requirements.

SUMMARY OF THE INVENTION

An improved event timer apparatus, debug interface and method are provided that enable the use of non-real time validation software.

In one embodiment, an event timer apparatus is provided, comprising a hardware timer. The hardware timer includes at least an up-counter, a match register and a comparator. The up-counter counts clocks of a clock signal. The match register stores a programmable count value. The comparator monitors whether the up-counter's count value matches the count value of the match register. The event timer apparatus further comprises a debug interface. The debug interface includes an enable control unit for enabling the up-counter's operation based on a pre-defined relationship between a state of an enable signal supplied to said up-counter and an internal state of the hardware timer.

In another embodiment, a debug interface for use with an event timer apparatus is provided. The event timer apparatus comprises a hardware timer which includes at least an up-counter, a match register, and a comparator. The up-counter counts clocks of a clock signal. The match register stores a programmable count value. The comparator monitors whether the up-counter's count value matches the count value of the match register. The debug interface comprises an enable control unit for enabling the up-counter's operation based on a pre-defined relationship between a state of an enable signal for that up-counter and an internal state of the hardware timer.

In still another embodiment, a method for debugging the operation of an event timer is provided. Said event timer comprises a hardware timer including at least an up-counter, a match register, and a comparator. The up-counter counts clocks of a clock signal. The match register stores a programmable count value. The comparator monitors whether the up-counter's count value matches the count value of the match register. The method monitors an internal state of that event timer and generates a hold signal to stop the operation of the up-counter if a monitored internal state matches a pre-defined condition.

Further embodiments are the subject-matter of dependent claims.

BRIEF DESCRIPTION OF THE DRAWINGS

The accompanying drawings are incorporated into and form a part of this specification for the purpose of explaining the principles of the invention. The drawings are not to be construed as limiting the invention to only the illustrated and described examples of how the invention can be made and used. Further features and advantages could become apparent from the following and more particular description of the invention, as illustrated in the accompanying drawings, wherein.

DETAILED DESCRIPTION OF THE INVENTION

The illustrative embodiments of the present invention will be described with reference to the Figure drawings.

Figure 1:
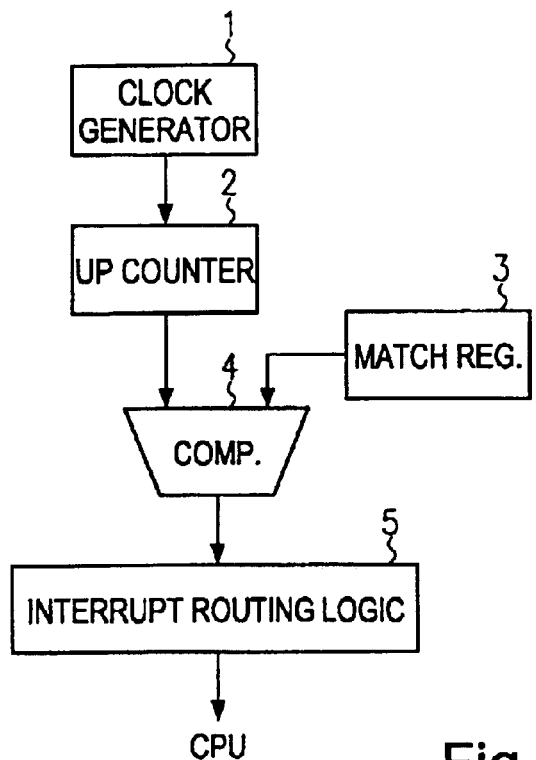
FIG. 1 is a block diagram illustrating the general configuration of an event timer.
Figure 3:
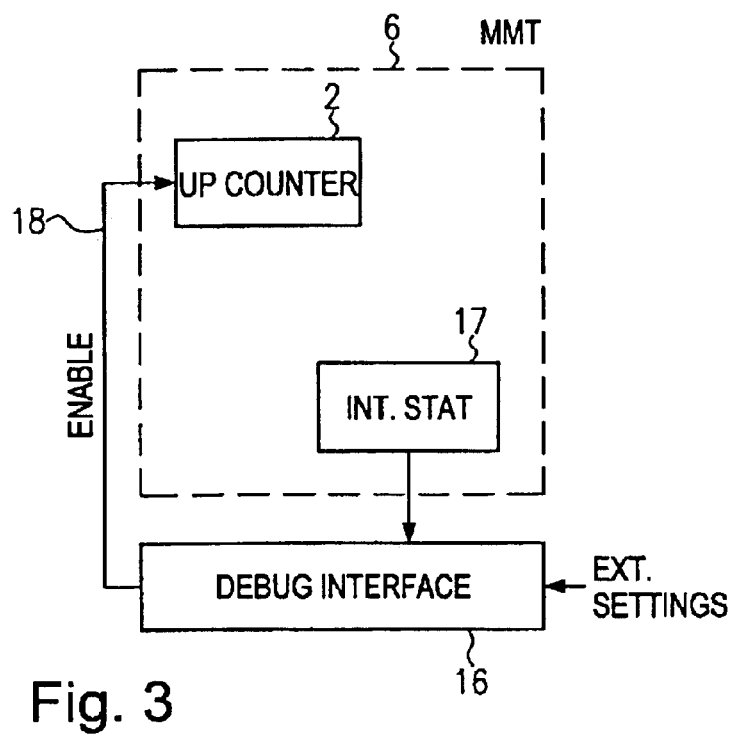
FIG. 3 is a block diagram generally illustrating the interaction of a debug interface with the event timer.
Figure 2:
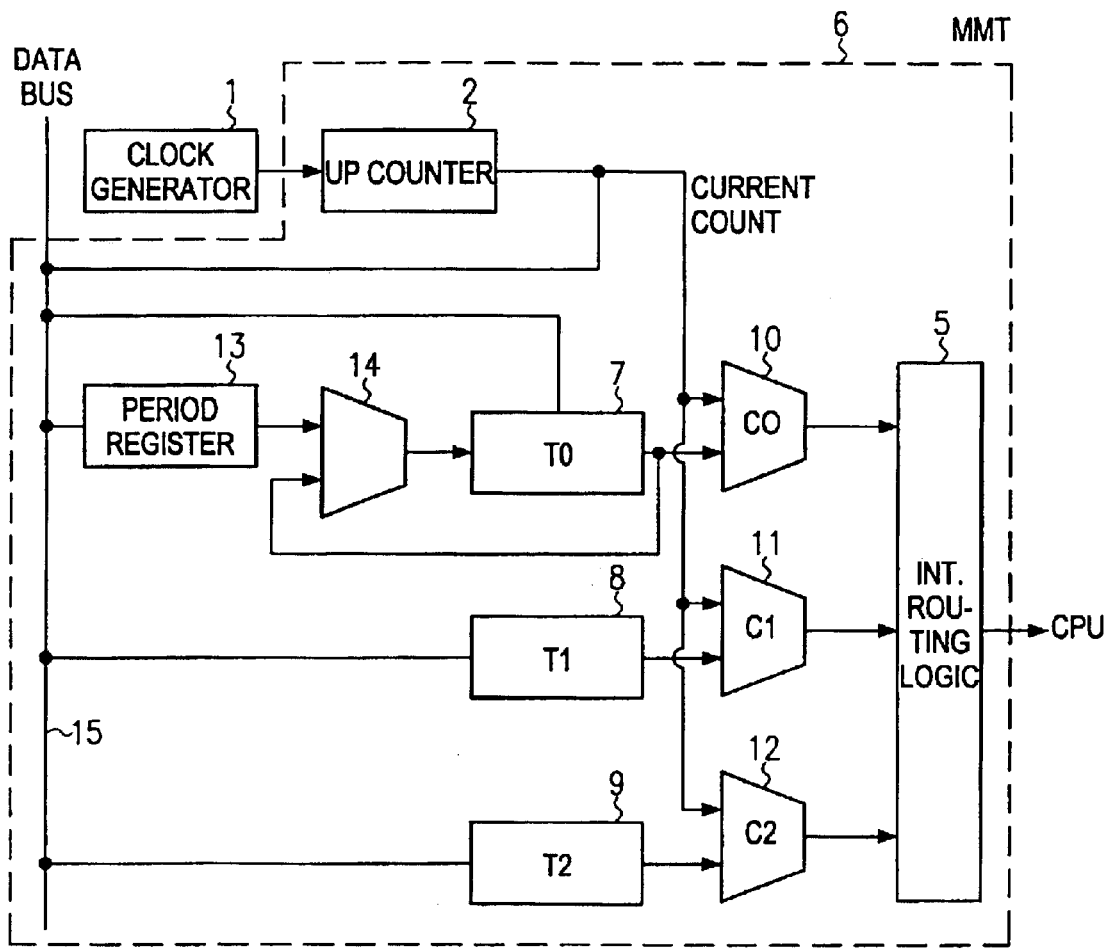
FIG. 2 is a block diagram illustrating the hardware configuration of a recently developed event timer.

Referring to the drawings and in particular to FIG. 3, which illustrates a debug interface connected to an event timer. The configuration of FIG. 3 shows those components of an event timer, in particular the event timer (MMT) 6 as described with reference to FIG. 2, which interact with a debug interface as described herein. The debug interface 16 of the present invention monitors internal states of the event timer 6. The debug interface 16 generates an enable signal 18 for controlling the operation of the up-counter 2 in the event timer 6 based on a pre-defined relationship between the monitored internal state of the event timer and the enable signal 18. Preferably, the internal states of the event timer 6, e.g. interrupts generated by the event timer, are stored in a register 17 which may be read by the debug interface 16.

Due to the functionality built into the debug interface 16, interrupt events will be triggered upon the occurrence of a programmed internal event, e.g. an interrupt generated by a comparator of the event timer, without having to first transmit data off-chip. The event to be monitored may be programmed externally by setting a particular register in the debug interface, details of which will be described below.

In the event timer apparatus 6, the data registers for latching events are implemented "on-chip". It is difficult to debug both, the event timer and software used therewith. By the use of the integral debug interface 16, the variety of internal signals which only exists internally on a chip and does not propagate to the top of the chip, may be designed to receive signals from the event timer and trigger the event timer based on a pre-programmed relationship. Being programmable, the debug interface 16 comprises at least a programmable debug register for holding parameters controlling the up-counter's operation, i.e. a start and stop the up-counting procedure.

Figure 4:
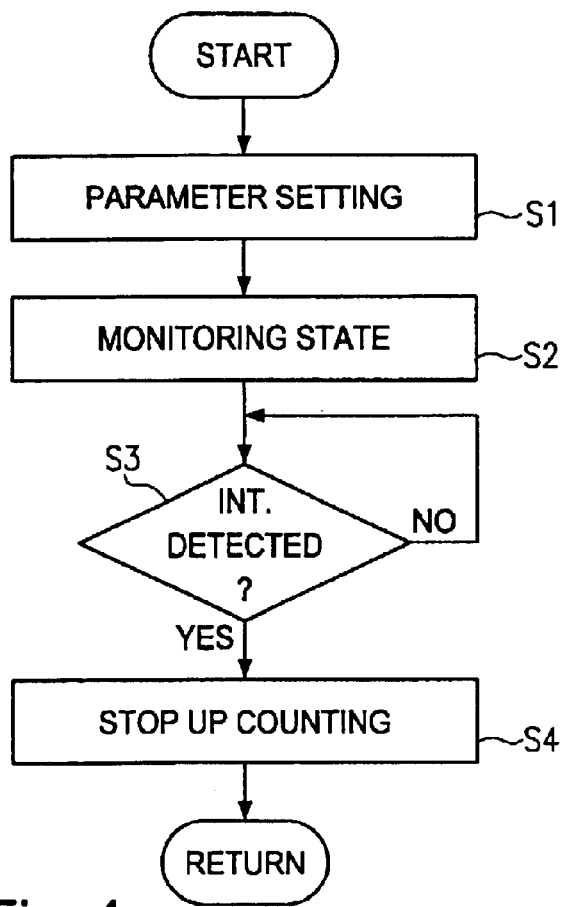
FIG. 4 is a flow chart illustrating a sequence of steps used during a debug procedure in connection with an event timer.

An exemplary flow chart illustrating a debug operation is shown in FIG. 4. After the parameters for the selection of internal state has been externally set (step S1) the debug operation enters a monitoring state (step S2). If the pre-programmed internal state is detected (step S3) the up-counter's operation is stopped (step S4). Such a debug procedure enables a user to intentionally stop the timer operation depending on the occurrence of a pre-programmed event. Thus, the event timer's and the software's functionality may be step-wisely validated. Such a debug operation enables an efficient validation without a need for transmit data off-chip. The debug interface needs only to be programmed by setting the debug register.

Figure 5:
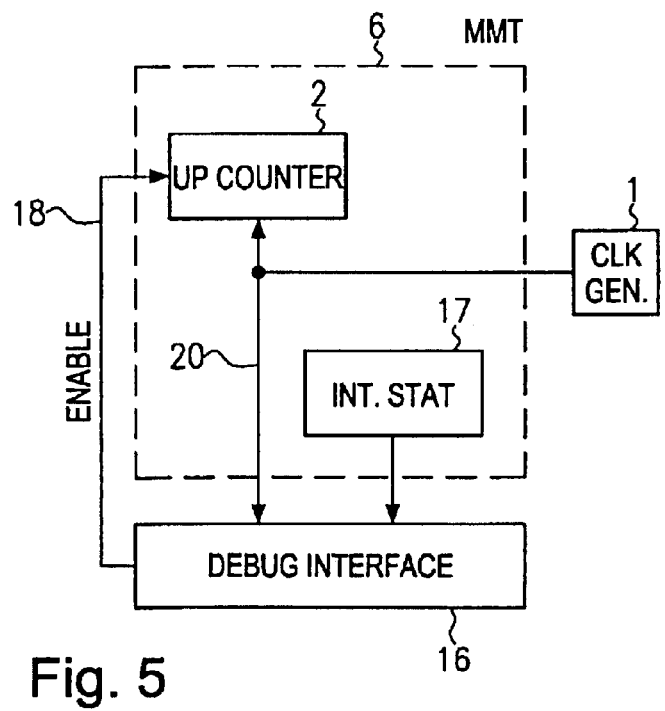
FIG. 5 is a block diagram illustrating the interaction of a debug interface with an event timer in more detail.

In one particular embodiment, the debug interface allows to adaptively set the event timer's processing speed. In particular, the processing speed for approaching particular internal events may be reduced in order to cope with the non-real time software capabilities. The configuration of such a particular embodiment is illustrated in FIG. 5. As illustrated therein, the up-counter's clock signal from clock generator 1 is further branched off to the debug interface 16. Based on the received clock signal 20, the debug interface is put into a position to control the up-counter's counting procedure. The particular configuration of such a debug interface will be described in more detail below.

Figure 6:
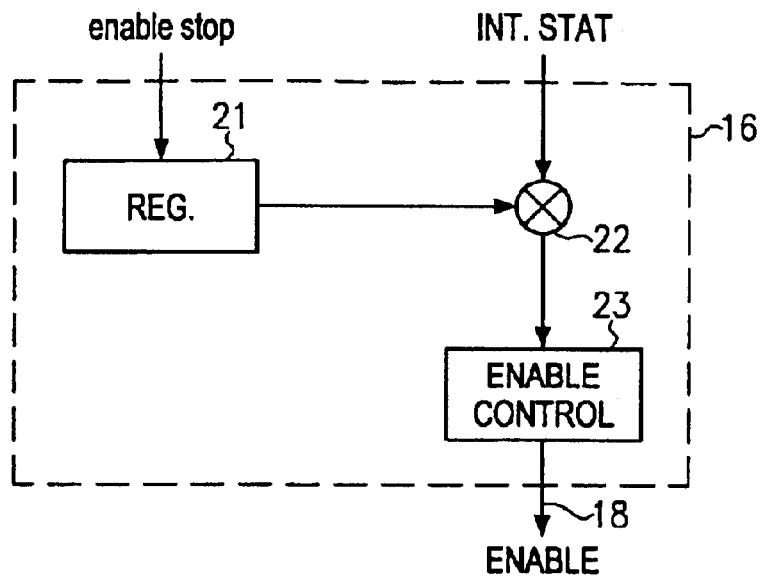
FIG. 6 is a block diagram illustrating an exemplary embodiment of the debug interface of FIG. 3.

Turning now to FIG. 6, illustrating a particular implementation of debug interface 16. Debug interface 16 comprises an enable control unit 23, monitoring means 22 and a debug register 21. Upon receiving a pre-programmed event signal from monitoring means 22, the enable control unit 23 generates a stop signal in order to set the up-counter's operation on hold. A particular event of the event timer 6 is monitored by monitoring means 22 which is connected to the debug register 21. Debug register 21 can be programmed to select a particular internal state by setting an "enable stop" register or bit by the user. To monitor the internal state, the monitoring means 22 may be a multiplier multiplying the internal state with the value set in the debug register 21. Alternatively, the monitoring means may be an AND gate or may exclusively OR the internal state with the register's signal. As those skilled in the art will appreciate, the monitoring means may be implemented to the same effect using a variety of means for passing the selected event signals to be monitored.

Figure 7:
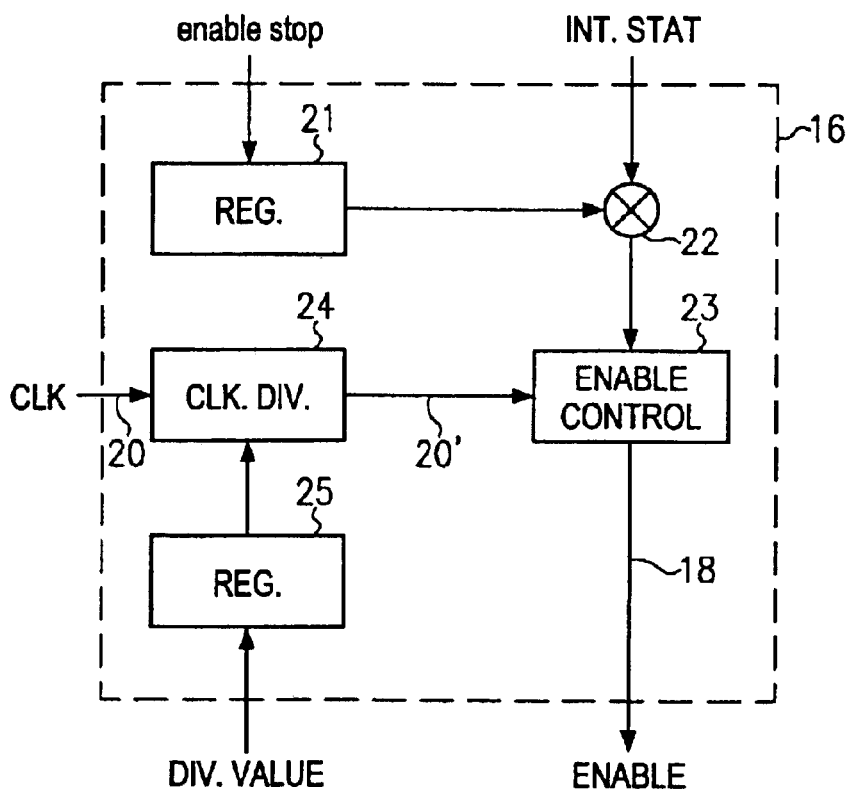
FIG. 7 is a block diagram illustrating an exemplary embodiment of the configuration of a debug interface as shown in FIG. 5.

As previously stated, the above-described debug interface 16 may be used to reduce the processing speed of the event timer. An exemplary embodiment of such a debug interface is illustrated in FIG. 7. The debug interface 16 is similar to the configuration shown in FIG. 6. Additionally, the debug interface comprises a clock divider 24 connected to the enable control unit and connected to a divider value register

25. The received clock value 20 branched off from the clock signal, provided to the up-counter 2, is received by clock divider 24 in order to reduce the clock's frequency in accordance with the pre-programmed divider value. The new clock 20' having a reduced clock frequency is applied to the enable control unit 23. Based on the received clock 20' with the reduced clock frequency, the enable control unit adapts the up-counter's processing speed to the reduced clock frequency by generating appropriate start/stop signals 18. In order to preserve the reduced processing speed of the event timer, the start/stop signal 18 is produced periodically. In this manner, the event timer's operation and the processing of the validation software may be monitored step-wisely in response to the external settings of the debug interface.

These external settings may be provided in separate debug registers, namely for programming internal states to be monitored in debug register 21 and a clock divider value register 25, or in a common register combining all externally set parameters.

Figure 8:
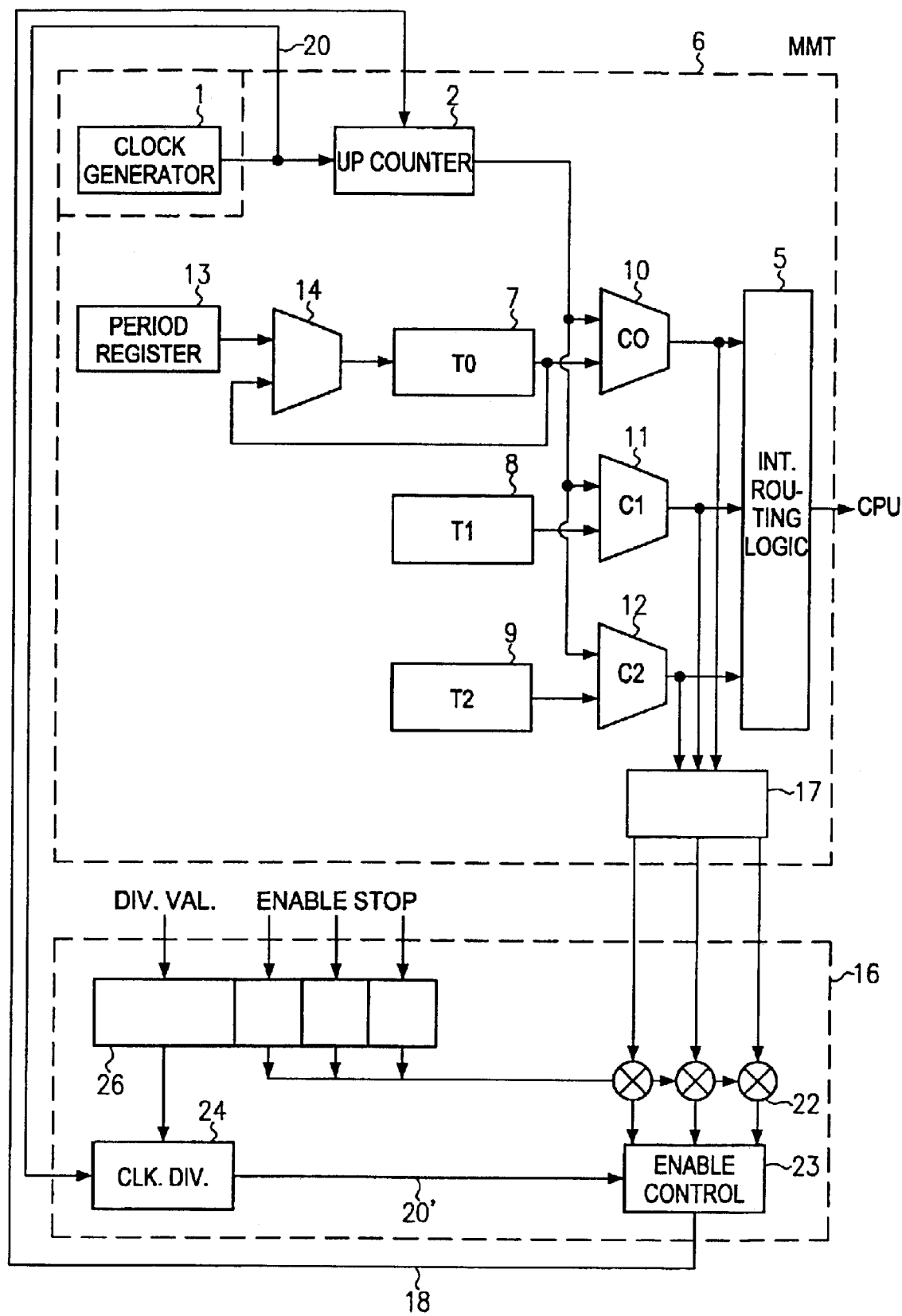
FIG. 8 is a block diagram illustrating a detailed configuration of the debug interface and an event timer.

FIG. 8 illustrates the configuration of an event timer and debug interface, referred to above. As previously stated, the above-described event timer 6 may be an event timer as currently developed for use with personal computers. In a preferred embodiment of the debug interface 16, the event timer 6 is such an event timer. The particular configuration of the event timer shown in FIG. 8 is similar to that described in connection with FIG. 2. The on-chip event timer FIG. 8 differs from that of FIG. 2 by an internal register 17 which allows the debug interface to read the current internal states. Further, the on-chip implementation of the event timer comprises an up-counter 2 the operation of which is controlled by the on-chip debug interface 16, in particular by the enable control unit 23 included in the debug interface. In addition, the clock signal provided to up-counter 2 is branched off to the debug interface.

The configuration of debug interface 16 shown in FIG. 8 is similar to that illustrated in FIG. 7. The illustrated configuration differs from that of FIG. 7 by a single debug control register 27 storing pre-programmed parameters relating to a divider value for controlling clock divider 24 and enable stop bits for selecting particular internal states to be monitored. In particular, the illustrated configuration monitors a plurality of internal states stored in register 17. Which of the internal states may trigger a stop signal generated by the enable control unit 23 depends on the settings in the debug control user 26. Only those interrupts may trigger a response of the enable control unit 23 which are previously selected by a user in the debug control register 26.

An important feature of the above described configuration is the ability to generate a stop signal for halting the up-counter's operation without transmitting any internal data off-chip. The debug interface enables a software and event timer validation procedure by simply setting the parameters of the above-identified debug control register.

External hardware and software may be used to program the aforementioned parameters and conditions, to receive an interrupt match and event data, and to interpret the interrupt match and event data to debug the event timer and software.

Summarizing, the debug interface enables an external user to monitor internal states of the event timer and to stop the event timer's main counter based on internal conditions. The debug interface supports a successful validation by enabling a stop of the event timer's operation after the current count matches a pre-defined condition, by reducing the input clock for the up-counter to monitor the timer operation by software, and to start the counter for a pre-determined number of cycles. This allows to previously define a number of counting steps to be performed by up-counter 2.

An important feature of the above-described event timer and debug interface is the ability to enable the testing and debug of the event timer without degrading the operation of other functions of the event timer.

While the invention has been described with respect to the physical embodiments constructed in accordance therewith, it will be apparent to those skilled in the art that various modifications, variations and improvements of the present invention may be made in light of the above teachings and within the purview of the independent claims without departing from the spirit and the intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the dependent claims.

What is claimed is:

1. An event timer apparatus comprising a hardware timer, including at least an up-counter for counting clocks of a clock signal, a match register for storing a programmable count value, and a comparator for monitoring whether the up-counter's count value matches the count value of the match register, and comprising a debug interface including an enable control unit for enabling the up-counter's operation based on a pre-defined relationship between a state of an enable signal supplied to said up counter and an internal state of the hardware timer.

2. The event timer apparatus according to claim 1, wherein said internal state being an interrupt generated by said comparator when the count values of said up counter and of said match register match.

3. The event timer apparatus according to claim 1 wherein said hardware timer being a high resolution timer.

4. An integrated circuit structure having an event timer apparatus according to claim 1 formed as a part thereof.

5. A debug interface for use with an event timer apparatus which comprises a hardware timer, including at least an up-counter for counting clocks of a clock signal, a match register for storing a programmable count value, and a comparator for monitoring whether the up-counter's count value matches the count value of the match register, said debug interface comprising an enable control unit for enabling the up-counter's operation based on a pre-defined relationship between a state of an enable signal for said up-counter's operation and an internal state of the hardware timer.

6. The debug interface according to claim 5, further comprising monitoring means for receiving an internal state of said hardware timer and an enable stop selection signal and for forwarding a received internal state to said enable control unit if the corresponding enable stop selection being set.

7. The debug interface according to claim 5, wherein said internal state of said hardware timer being an interrupt generated by said comparator when the count values of said up-counter and of said match register match.

8. An integrated circuit structure having a debug interface according to claim 5 formed as part thereof.

9. A method for debugging the operation of an event timer, said event timer comprising a hardware timer including at least an up-counter for counting clocks of a clock signal, a match register for storing a programmable count value, and a comparator for monitoring whether the up counter's count value matches the count value of the match register, said method comprising the steps of:

monitoring an internal state of said event timer, and generating a halt signal to stop the operation of the up-counter if the monitored internal state matches a pre-defined condition.

10. An event timer apparatus comprising a hardware timer, including at least an up-counter for counting clocks of a clock signal, a match register for storing a programmable count value, and a comparator for monitoring whether the up-counter's count value matches the count value of the match register, and comprising a debug interface including an enable control unit for enabling the up-counter's operation based on a pre-defined relationship between a state of an enable signal supplied to said up counter and an internal state of the hardware timer, wherein said debug interface further comprises monitoring means for receiving an internal state of said hardware timer and an enable stop selection signal and for forwarding a received internal state to said enable control unit if the corresponding enable stop selection being set.

11. The event timer apparatus according to claim 10, wherein said debug interface further comprises a stop enable control register for storing the selection of an enable stop, said enable stop control register being connected to said monitoring means.

12. The event timer apparatus according to claim 11, wherein said debug interface comprises a plurality of monitoring means and corresponding enable stop control registers for individually monitoring and forwarding a plurality of internal states of said hardware timer.

13. The event timer apparatus according to claim 10, wherein said monitoring means being a multiplier.

14. The event timer apparatus according to claim 10, wherein said monitoring means being an exclusive OR gate.

15. The event timer apparatus according to claim 10, wherein said monitoring means being an AND gate.

16. An event timer apparatus comprising a hardware tuner, including at least an up-counter for counting clocks of a clock signal, a match register for storing a programmable count value, and a comparator for monitoring whether the up-counter's count value matches the count value of the match register, and comprising a debug interface including an enable control unit for enabling the up-counter's operation based on a pre-defined relationship between a state of an enable signal supplied to said up counter and an internal state of the hardware timer, wherein said debug interface further comprising a clock divider for receiving the upcounter's clock signal and for supplying a clock signal of a reduced clock frequency in accordance with a programmable divider value to said enable control unit and said enable control unit adapting the upcounter's operation to the clock signal of the reduced clock frequency.

17. The event timer apparatus according to claim 16, wherein said debug interface further comprises a clock control register for storing said programmable divider value.

18. A debug interface for use with an event timer apparatus which comprises a hardware timer, including at least an up-counter for counting clocks of a clock signal, a match register for storing a programmable count value, and a comparator for monitoring whether the up-counter's count value matches the count value of the match register, said debug interface comprising an enable control unit for enabling the up-counter's operation based on a pre-defined relationship between a state of an enable signal for said up-counter's operation and an internal state of the hardware timer, and a debug control register for setting control parameters for the generation of said enable signal by said enable control unit.

19. The debug interface according to claim 18, further comprising a clock divider for receiving the up-counter's clock signal and for supplying a clock signal of a reduced clock frequency which is reduced in accordance with a programmable divider value to said enable control unit and said enable control unit adapting the up-counter's operation to the clock signal of the reduced clock frequency.

20. A method for debugging the operation of an event timer, said event timer comprising a hardware timer including at least an up-counter for counting clocks of a clock signal, a match register for storing a programmable count value, and a comparator for monitoring whether the up counter's count value matches the count value of the match register, said method comprising the steps of:

monitoring an internal state of said event timer, and generating a halt signal to stop the operation of the up-counter if the monitored internal state matches a pre-defined condition;

wherein said internal state is an interrupt generated if the count values of said up counter and of said match register in said event timer match and said hold signal being generated at said generating step after deleting said interrupt.

21. The method according to claim 19, further comprising the steps of:

receiving the up-counter's clock signal, obtaining a pry-programmed clock divider value, generating a clock signal, based on the received up-counter's clock signal, having a reduced clock frequency in accordance with the clock divider value, and generating said hold signal for adapting the up-counter's operation to the reduced clock frequency.

* * * * *